United States Patent
Hsieh

(10) Patent No.: US 7,282,888 B2
(45) Date of Patent: Oct. 16, 2007

(54) AC FAN MOTOR DRIVING CIRCUIT HAVING DETECTING CURRENT WAVE CAPABILITY

(75) Inventor: Hsin-Mao Hsieh, Ping Tung (TW)

(73) Assignee: ADDA Corp., Ping Tung (TW)

( * ) Notice: Subject to any disclaimer, the term of this patent is extended or adjusted under 35 U.S.C. 154(b) by 114 days.

(21) Appl. No.: 11/311,274

(22) Filed: Dec. 20, 2005

(65) Prior Publication Data

US 2007/0138994 A1    Jun. 21, 2007

(51) Int. Cl.
*H02P 27/04* (2006.01)

(52) U.S. Cl. ............... 318/800; 318/434; 318/254; 318/138; 318/439; 318/461; 388/806; 388/815

(58) Field of Classification Search ........... 318/800, 318/434, 254, 138, 439, 461; 388/806, 815, 388/822, 823, 907.5
See application file for complete search history.

(56) References Cited

U.S. PATENT DOCUMENTS

2005/0017665 A1*  1/2005  Horng et al. ............... 318/434

* cited by examiner

*Primary Examiner*—Karen Masih
(74) *Attorney, Agent, or Firm*—Posz Law Group, PLC; R. Eugene Varndell, Jr.

(57) ABSTRACT

A driving circuit of an AC fan motor has an AC to DC converter, a current detecting unit, a step-down divider, a motor driving unit, two windings each having many coils and a harmonic wave elimination unit. The AC to DC converter converts AC power to high voltage DC power. The motor driving unit is connected to the step-down divider to obtain low voltage DC power to operate. The two windings are directly connected to the AC to DC converter through the current wave detect unit to obtain the high voltage DC power. Therefore, the current wave detecting unit can response current changes of windings and then an operator can simulate present current wave of the windings to determine the present operating status of the AC fan motor.

11 Claims, 5 Drawing Sheets

US 7,282,888 B2

AC FAN MOTOR DRIVING CIRCUIT HAVING DETECTING CURRENT WAVE CAPABILITY

BACKGROUND OF THE INVENTION

1. Field of the Invention

The present invention relates to a driving circuit of an AC fan motor and more particularly to an AC fan motor driving circuit providing a current wave detecting capability to adjust the operating status of AC fan motor.

2. Description of Related Art

With reference to FIG. 4, one driving circuit of one AC fan motor has an AC to DC converter (20), a regulated voltage divider (21), a motor driving unit (22), two windings (23), a harmonic wave suppression unit (24) and an current protection unit (25).

The AC to DC converter (20) is connected to the AC power through the current protection unit (25). The AC to DC converter (20) coverts the AC power to high voltage DC power and then outputs the high voltage DC power to regulated voltage divider (21).

With further reference to FIG. 5, the regulated voltage divider (21) has a large resistor, a node and a zener diode (ZD1) connected in series. The large resistor is connected to the AC to DC converter, and may be two large resistors (R1, R2). The node is connected to the large resistor. The zener diode (ZD1) has a breakdown voltage, is connected between the node and ground and operates at the breakdown voltage. Consequently, a regulated low voltage is dropped across the zener diode (ZD1) and provided at the node.

The motor driving unit (22) is connected to the regulated voltage divider (21) to obtain low voltage DC power and has a first transistor (Q1), a second transistor (Q2), a driving IC (IC1) and a Hall sensor (H1). Each transistor (Q1, Q2) has a base terminal (B), a collector terminal (C) and an emitter terminal (E). The driving IC (IC1) has a low voltage DC input, two Hall signal inputs (H+, H−) and two control outputs (O1, O2). The low voltage DC input is connected to the node in the regulated voltage divider (21). The two control outputs (O1, O2) are connected respectively to the base terminals (B) of the transistors (Q1, Q2). The Hall sensor (H1) is connected to the Hall signal inputs (H+, H−) of the driving IC (IC1) and has a low voltage DC input connected to the node in the regulated voltage divider (21). Therefore, the driving IC (IC1) output controlling signals to the base terminals (B) of the transistors (Q1, Q2) to alternately turns the transistors (Q1, Q2) on and off according to the Hall signals from the Hall sensor.

The windings (23) have a first winding (L1) and a second winding (L2) and are connected to the high voltage DC power, the filter (C1) and respectively to the collector terminals (C) of the transistors (Q1, Q2). Since the windings (23) are directly connected to high voltage DC power, a large current is passed through the windings (23). To prevent the windings (23) from being damaged by the large current, each winding (L1, L2) has many coils to increase the resistance. Therefore, the large current will be held in a suitable range to increase the rotation rate of the AC fan motor, and the windings (L1, L2) will not be damaged.

The harmonic wave suppression unit (24) is connected to the high voltage DC power in parallel with the windings (L1, L2) and has two diodes (D2, D3) and a zener diode (ZD2). Each diode (D2, D3, ZD2) has a negative terminal and a positive terminal. The negative terminals of the two diodes (D2, D3) and the zener diode (ZD2) are connected together. The positive terminals of the two diodes (D2, D3) are connected respectively to the collector terminals (C) of the transistors (Q1, Q2). The positive terminal of the zener diode (ZD2) is connected to the high voltage DC power and the filter (C1) to obtain high voltage DC power.

In the driving circuit, the driving IC and Hall sensor are important elements to keep the AC motor in a steady situation. However, the present driving circuit does not have a detecting current through the windings function so the operator can not further adjust the operating status of the AC motor.

Further, the regulated voltage divider uses the two large resistors and zener diode to divide to low voltage, but the two large resistors are easily heated to reduce useful life, since the large current passes through the two large resistors when they are connected to high voltage DC power.

Therefore, the present invention provides a driving circuit of an AC fan motor to add the detecting current wave function and increase the useful life of the regulated voltage divider.

SUMMARY OF THE INVENTION

The main objective of the present invention is to provide a driving circuit of an AC fan motor that adds a detecting current wave function and increase the useful life of the step-down divider.

A driving circuit of an AC fan motor has an AC to DC converter, a current detecting unit, a step-down divider, a motor driving unit, two windings each having many coils and a harmonic wave elimination unit. The AC to DC converter converts AC power to high voltage DC power. The motor driving unit is connected to the step-down divider to obtain low voltage DC power to operate. The two windings are directly connected to the AC to DC converter through the current wave detect unit to obtain the high voltage DC power. Therefore, the current wave detecting unit can response current changes of windings and then an operator can simulate present current wave of the windings to determine the present operating status of the AC fan motor.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
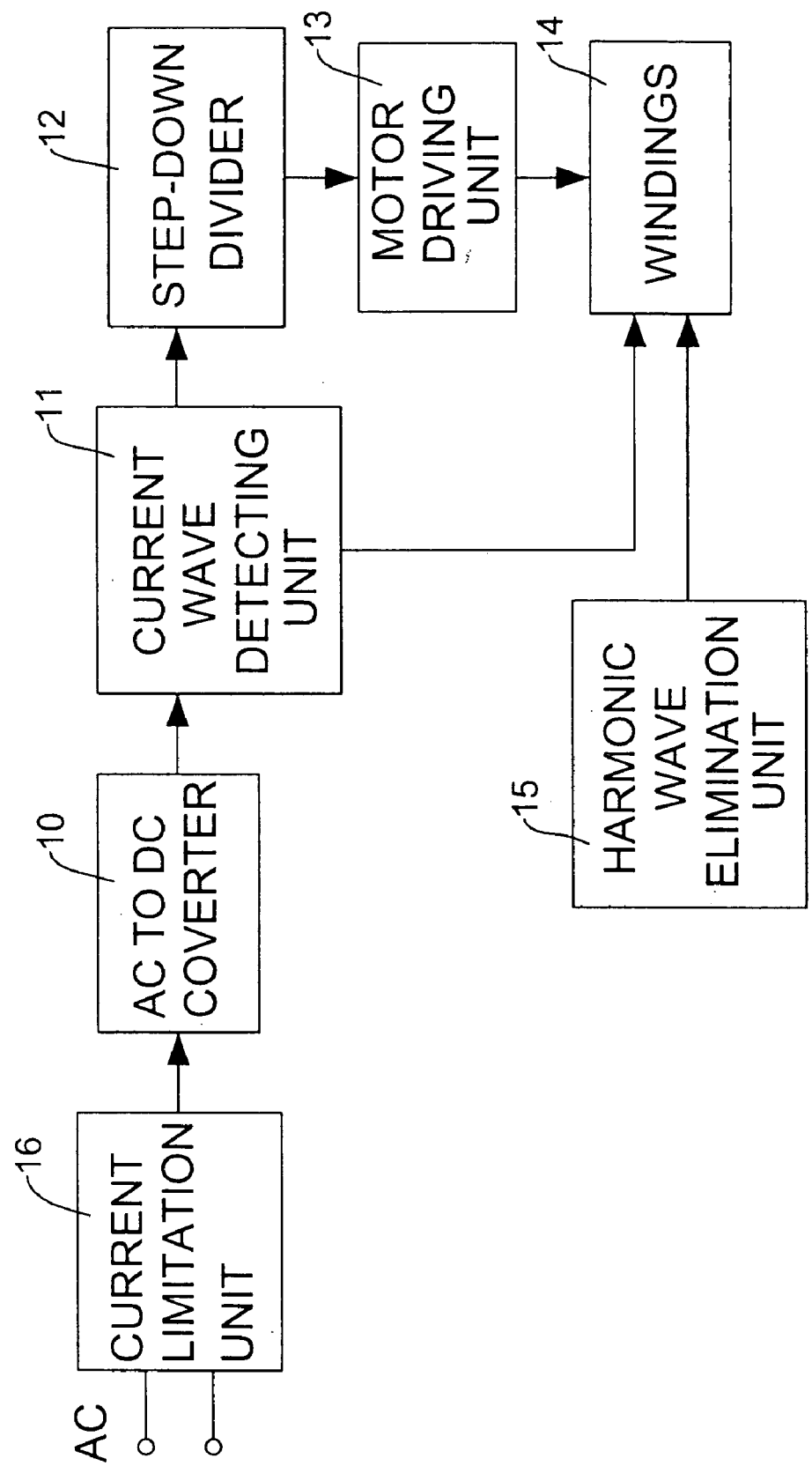
FIG. 1 is a functional block diagram of a driving circuit of an AC fan motor in accordance with the present invention.

With reference to FIG. 1, a preferred embodiment of a driving circuit for an AC fan motor has an AC to DC converter (10), a current wave detecting unit (11), a step-down divider (12), a motor driving unit (13), two windings (14), a harmonic wave elimination unit (15) and an optional current protection unit (16).

Figure 2:
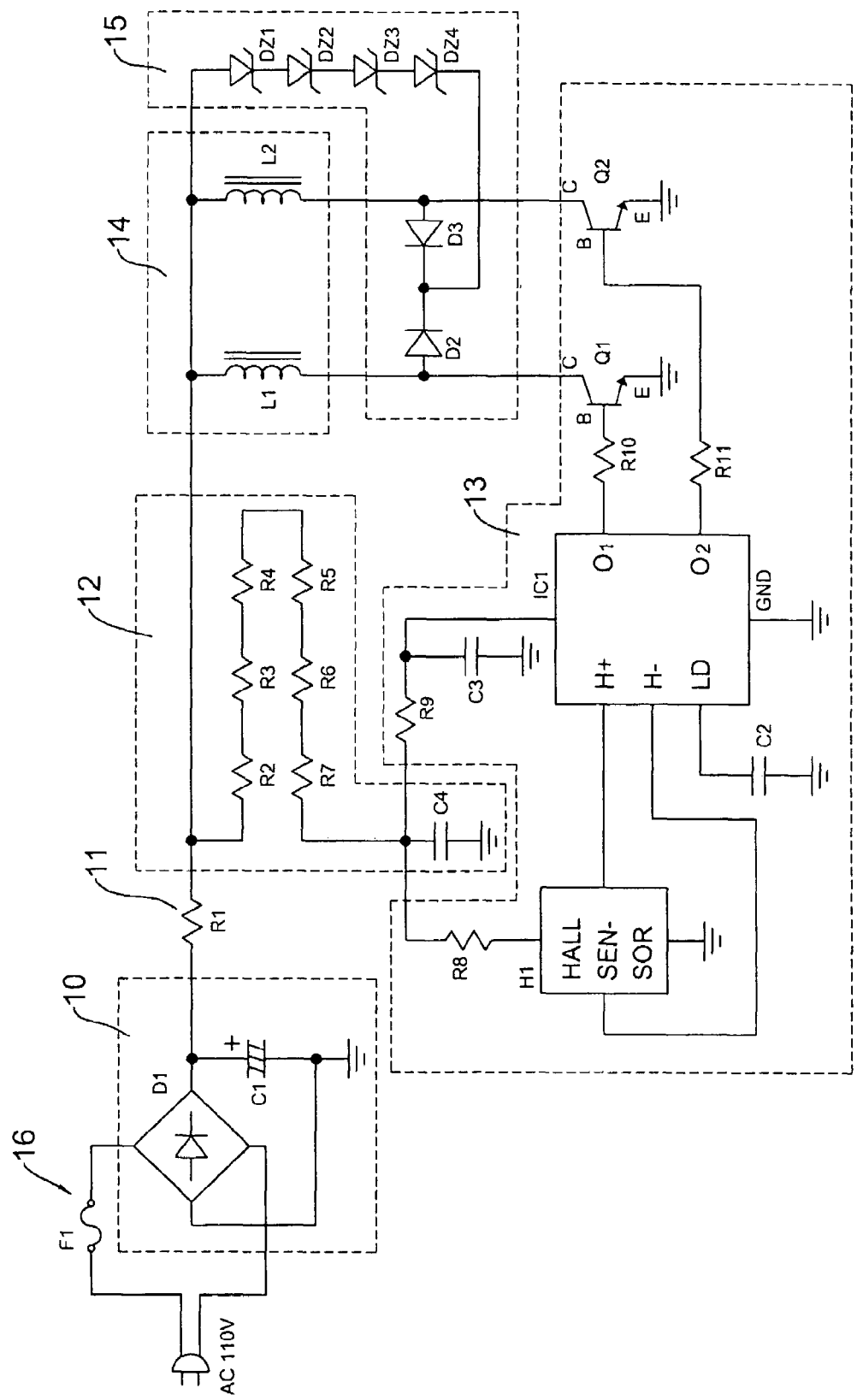
FIG. 2 is a circuit diagram of the driving circuit of an AC fan motor in FIG. 1.

With further reference to FIG. 2, the AC to DC converter (10) has a rectifier (D1) and a filter (C1). The rectifier (D1) can be a full wave rectifier and has an AC power input and DC power output. The AC power input is connected to an AC power source (AC 120V) to rectify AC power to DC power. The filter (C1) is a capacitor connected to DC power output to output high voltage DC power.

The step-down divider (12) is connected to the filter (C1) and the high voltage DC power through the current wave detecting unit (11) to obtain low voltage DC power. The step-down divider (12) has one series of resistors (R2~R7), a node and a capacitor (C4) connected in series. The series of resistors (R2~R7) is further connected to the high voltage DC power and the filter (C1). Therefore, a regulated low voltage is dropped across each resistor (R2~R7) to prevent each resistor (R2~R7) from reducing useful life since the large voltage is dropped thereon.

The node is connected to the series of resistor (R2~R7). The capacitor (C4) is connected between the node and ground. Consequently, the capacitor (C4) will be charged to store a regulated low voltage and provided at the node. In addition, the capacitor also provides a filtering DC power noise function.

The motor driving unit (13) is connected to the step-down divider (12) to obtain low voltage DC power and has a first transistor (Q1), a second transistor (Q2), a driving IC (IC1) and a Hall sensor (H1). Each transistor (Q1, Q2) has a base terminal (B), a collector terminal (C) and an emitter terminal (E). The driving IC (IC1) has a low voltage DC input, two Hall signal inputs (H+, H−) and two control outputs (O1, O2). The low voltage DC input is connected to the node in the step-down divider (12). The two control outputs (O1, O2) are connected respectively to the base terminals (B) of the transistors (Q1, Q2) to alternately turn the transistors (Q1, Q2) on and off. The Hall sensor (H1) is connected to the Hall signal inputs (H+, H−) of the driving IC (IC1) and has a low voltage DC input connected to the node in the step-down divider (12). The useful DC voltage range of the driving IC (IC1) can be 3 V to 24 V. The useful DC current range of the Hall sensor (H1) can be 2.5mA to 10mA.

The windings (14) have a first winding (L1) and a second winding (L2) and are connected to the high voltage DC power and the filter (C1) through the current wave detecting unit (11), and respectively connected to the collector terminals (C) of the transistors (Q1, Q2). Since the windings (14) are directly connected to high voltage DC power, a large current is passed through the windings (14). To prevent the windings (14) from being damaged by the large current, each winding (L1, L2) has many coils to increase the resistance. Therefore, the large current will be held in a suitable range to increase the rotation rate of the AC fan motor, and the windings (L1, L2) will not be damaged. Since high voltage DC power is applied to the windings (L1, L2), the AC fan motor has low power consumption and produces less heat.

The current wave detecting unit (11) is connected between the AC to DC converter (10) and the windings (14), and can be one resistor (R1). Therefore, when the windings (L1, L2) are connected to AC to DC converter (10) through the current wave detecting unit (11) to obtain DC power, the current will pass through the current wave detecting unit (11). Since the wave detecting unit (11) is the resistor, the voltage dropped cross the resistor (R1). Therefore, the voltage changes of the resistor (R1) is obtained to further simulate to a current wave corresponding to the current supplied to the windings (14). A resistance of the resistor (R1) is not larger than 5 ohm.

Consequently, an operator can detect two terminals of the resistor (R1) to obtain the voltage changes and further simulate to the current wave of the windings (14). The operator further determines the present operating status according to the simulated current wave.

Figure 3A:
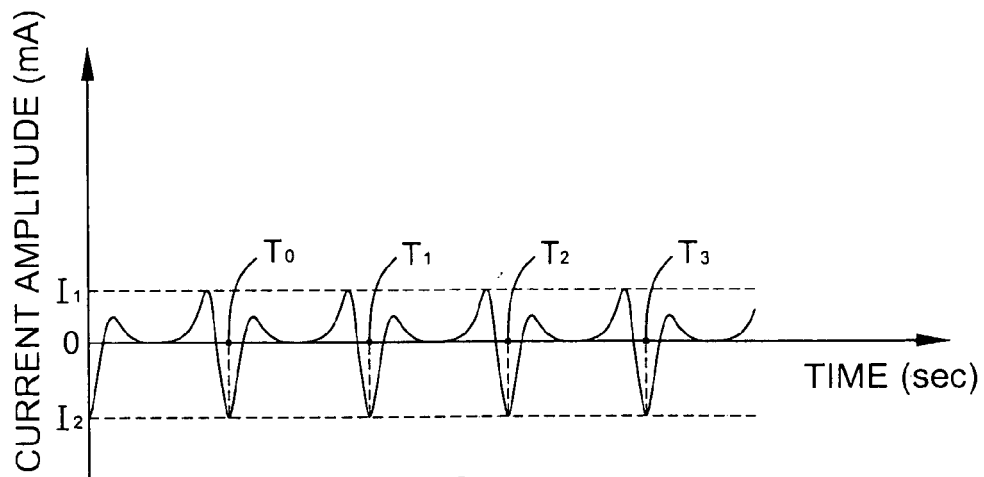
FIGS. 3A is a graph illustrated current wave of the windings of AC fan motor in a normal operating status.
Figure 3B:
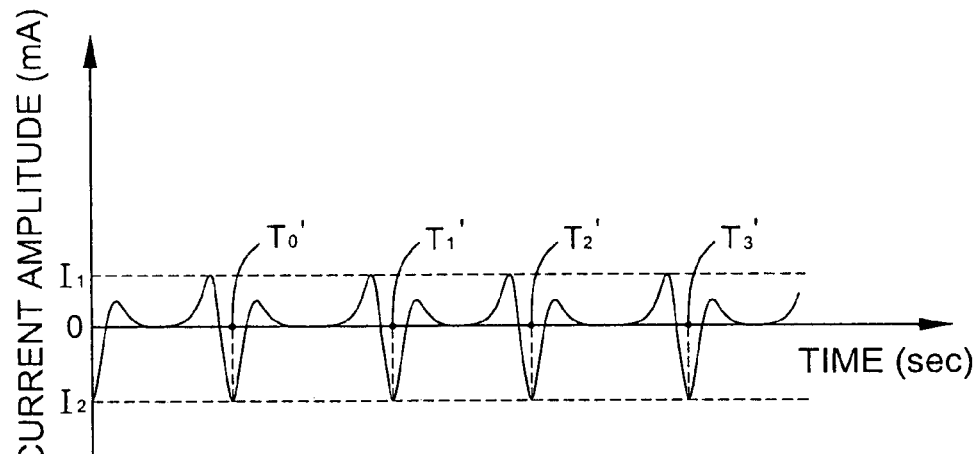
FIGS. 3B is a graph illustrated current wave of the windings of AC fan motor in an abnormal operating status.
Figure 3C:
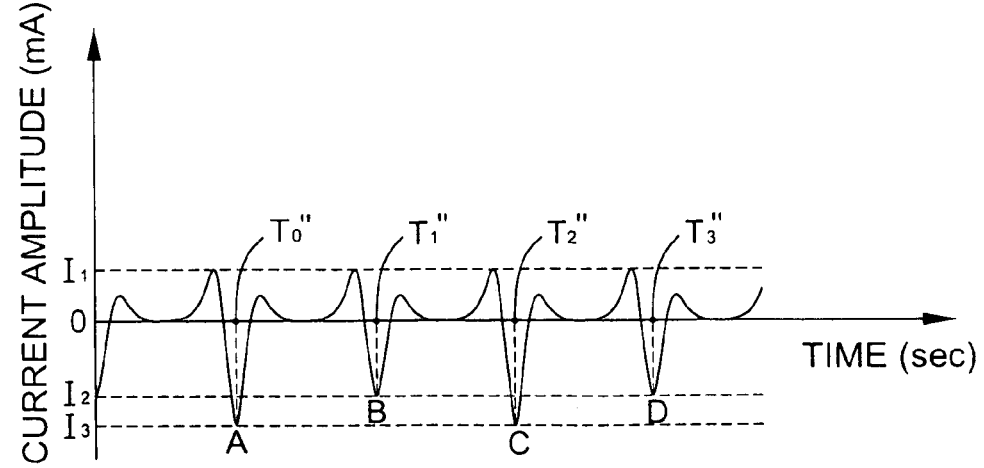
FIGS. 3C is a graph illustrated current wave of the windings of AC fan motor in another abnormal operating status.
Figure 4:
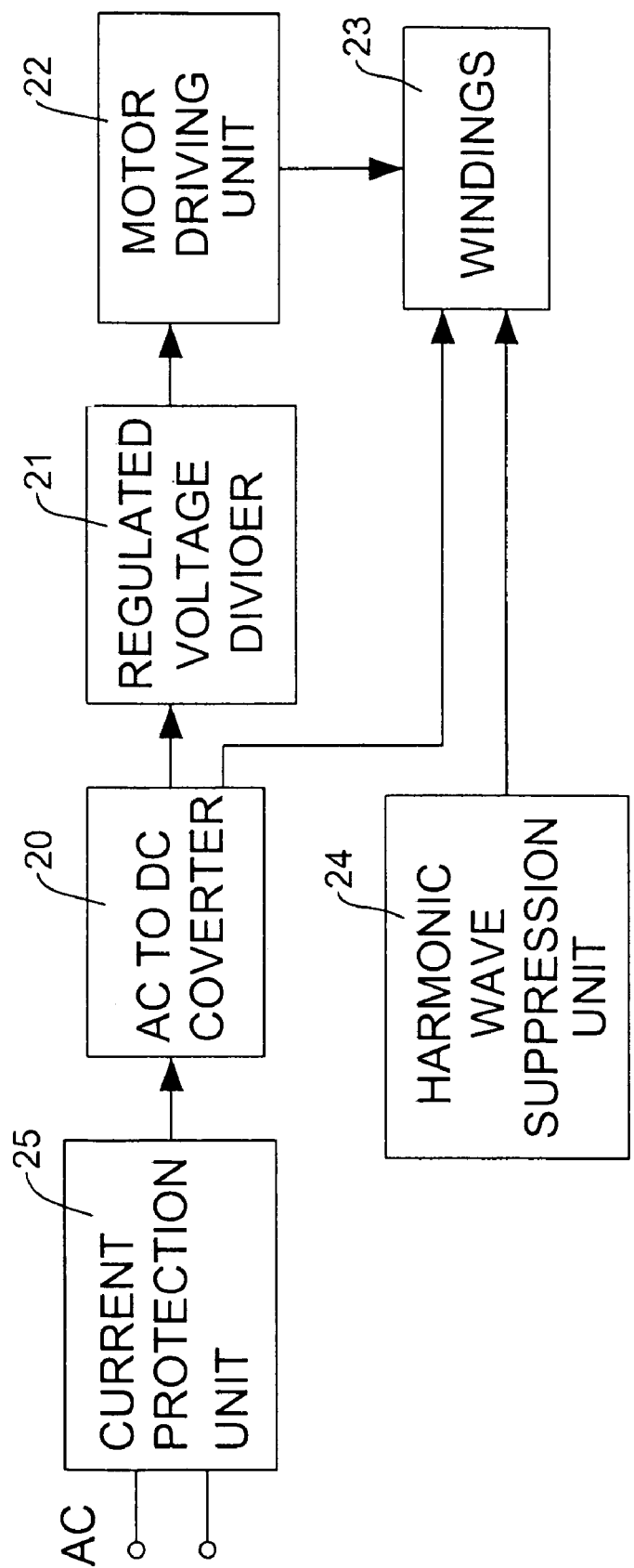
FIG. 4 is a functional block diagram of a driving circuit of an AC fan motor in accordance with the prior art.
Figure 5:
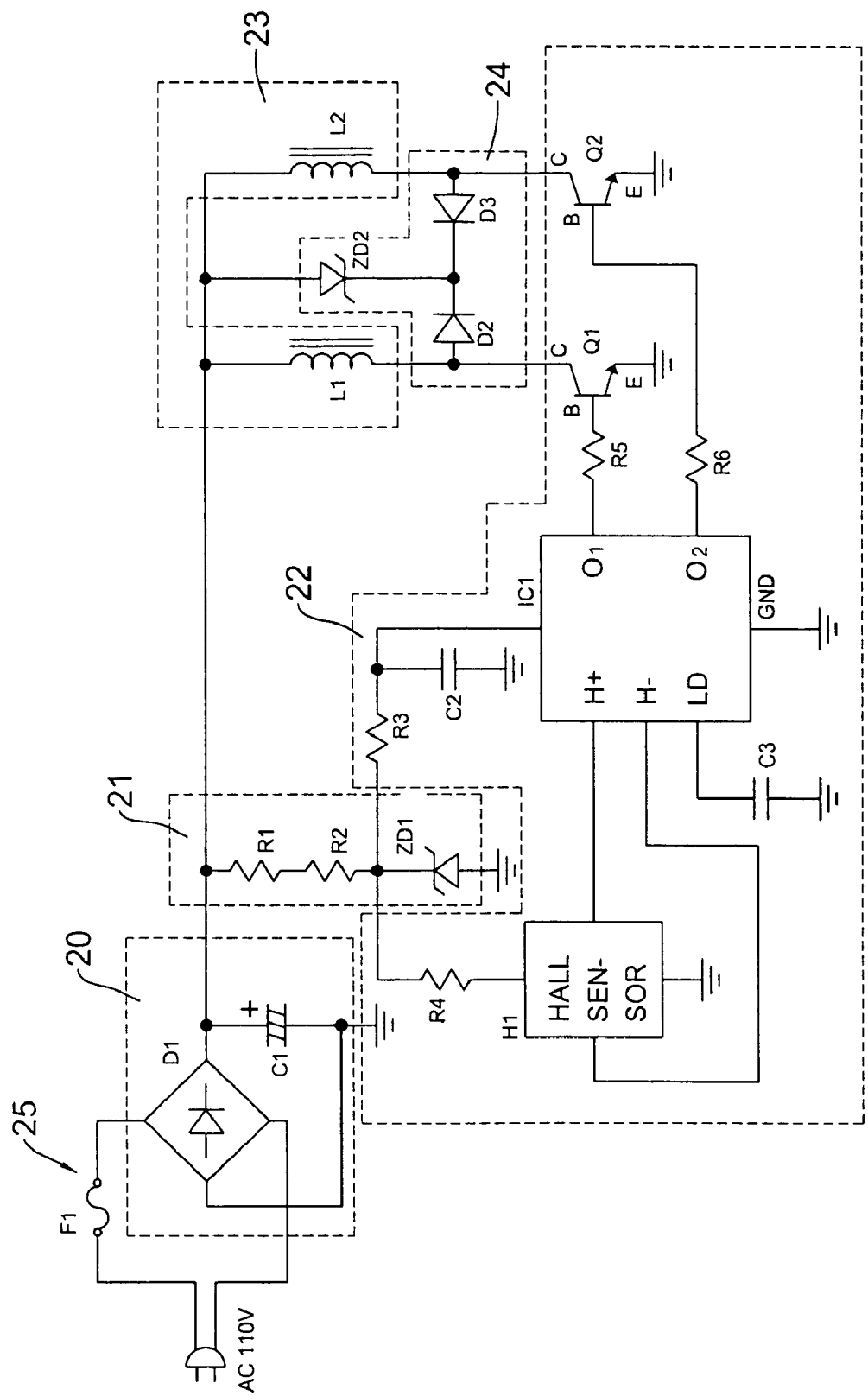
FIG. 5 is a circuit diagram of the driving circuit of an AC fan motor in FIG. 4.

With reference to FIG. 3A, the simulated current wave illustrates the normal current changes of windings when the AC fan motor with four poles spins one revolution. The normal current wave in one revolution should have four waveforms and each waveform has the same duty cycle $(0-T_0)$ $(T_0-T_1)$ $(T_1-T_2)$ $(T_2-T_3)$ and amplitude $(I_1\sim I_2)$. With further reference to FIG. 3B, the simulated current wave illustrates one type of abnormal current changes of windings when the AC fan motor with four poles spins one revolution. When the four waveforms have different duty cycles $(0-T_0)$ $(T_0-T_1)$ $(T_1-T_2)$ $(T_2-T_3)$, the AC fan motor has a vibration problem. FIG. 3C illustrates another type of abnormal current changes of windings. When the AC fan motor starts to spins and then electronic noise and electromagnetic interference (EMI) problem are happened, the four waveforms of the current wave of the windings have different amplitudes (A, B, C, D). Therefore, the operator can check the simulated current wave of the windings of the AC fan motor to determine whether the AC fan motor's present operating status.

The harmonic wave elimination unit (15) is connected to the high voltage DC power in parallel with the windings (L1, L2) and has two diodes (D2, D3) and a series of multiple zener diodes (DZ1~DZ4). Each diode (D2, D3, DZ1~DZ4) has a negative terminal and a positive terminal. The negative terminals of the two diodes (D2, D3) and the series of multiple zener diodes (DZ1~DZ4) are connected together. The positive terminals of the two diodes (D2, D3) are connected respectively to the collector terminals (C) of the transistors (Q1, Q2). The positive terminal of the series of multiple zener diode (ZD1~ZD4) is connected to the high voltage DC power and the filter (C1) through the current wave detecting unit (11) to obtain high voltage DC power.

The current protection unit (15) can be implemented with a fuse (F1) or a resistor and connected between the AC power source (AC 120 V) and the AC power input of the rectifier (D1).

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A driving circuit of an AC fan motor, comprising:
    an AC to DC converter having
        a rectifier having an AC power input and a DC power output and converting the AC power to DC power; and
        a filter connected to the DC power output to output high voltage DC power;
    a current wave detecting unit connected to the filter;
    a step-down divider connected to the filter through the current wave detecting unit to obtain low voltage DC power and having a series of multiple resistors connected to high voltage DC power and the filter;

a node connected to the series of multiple resistors; and a capacitor connected between the node and ground;

a motor driving unit connected to the step-down divider through the current wave detecting unit to obtain the low voltage DC power, and having:

two transistors, each transistor having a collector terminal, an emitter terminal and base terminal;

a driving IC having a low voltage DC input connected to the node in the step-down divider;

two Hall signal inputs; and two controlling outputs connected respectively to the base terminals of the transistors to alternately turn the transistors on and off; and a Hall sensor connected to the Hall signal inputs of the driving IC and having a low voltage DC input connected to the node in the step-down divider;

windings having a first winding and a second winding connected to the high voltage DC power and the filter through the current wave detecting unit, and respectively to the collector terminals of the transistors, and each winding having multiple coils; and a harmonic wave elimination unit connected to the high voltage DC power in parallel with the windings.

2. The driving circuit as claimed in claim 1, wherein the current wave detecting unit is a resistor.

3. The driving circuit as claimed in claim 2, wherein a resistance of the resistor is not larger 5 ohm.

4. The driving circuit as claimed in claim 1, further comprising a current protection unit connected between the AC power source and the AC power input of the rectifier.

5. The driving circuit as claimed in claim 1, wherein the protection unit is a fuse.

6. The driving circuit as claimed in claim 1, wherein the protection unit is a resistor.

7. The driving circuit as claimed in claim 1, wherein the harmonic wave elimination unit comprises two diodes, each diode having a negative terminal; and a positive terminal connected to the collector terminal of a corresponding transistor in the motor driving unit; and a series of multiple zener diodes having a negative terminal connected to the negative terminals of the two diodes; and a positive terminal connected to the high voltage DC power and the filter through the current wave detecting unit to obtain the DC power source with high voltage.

8. The driving circuit as claimed in claim 1, wherein the rectifier is a full wave rectifier.

9. The driving circuit as claimed in claim 1, wherein the filter is a capacitor.

10. The driving circuit as claimed in claim 1, wherein a voltage range of the driver IC is 3V to 24V.

11. The driving circuit as claimed in claim 1, wherein a current range of the Hall sensor is 2.5 mA to 10 mA.

* * * * *